United States Patent [19]

Ishii

[11] Patent Number: 5,684,533
[45] Date of Patent: Nov. 4, 1997

[54] COLOR VIDEO CAMERA CAPABLE OF IMPROVING GRADATION OF DARK SIGNAL LEVEL

[75] Inventor: Kenji Ishii, Tokyo, Japan

[73] Assignee: NEC Corporation, Tokyo, Japan

[21] Appl. No.: 601,468

[22] Filed: Feb. 14, 1996

Related U.S. Application Data

[63] Continuation of Ser. No. 266,583, Jun. 28, 1994, abandoned.

[30] Foreign Application Priority Data

Jun. 30, 1993 [JP] Japan ................................. 5-188800

[51] Int. Cl.[6] .................................................. H04N 5/202
[52] U.S. Cl. ......................... 348/254; 348/222; 348/674; 348/675
[58] Field of Search .............................. 348/207, 254, 348/257, 674, 675, 676, 677, 678, 649, 712, 222; H04N 5/202

[56] References Cited

U.S. PATENT DOCUMENTS

| | | | |
|---|---|---|---|
| 2,731,557 | 1/1956 | Clayden | 348/674 |
| 4,241,362 | 12/1980 | Van der Valk | 348/675 |
| 4,489,349 | 12/1984 | Okada | 348/674 |
| 4,969,045 | 11/1990 | Haruki et al. | 358/228 |
| 5,068,718 | 11/1991 | Iwabe et al. | 358/27 |
| 5,148,281 | 9/1992 | Nakamura et al. | 358/228 |

FOREIGN PATENT DOCUMENTS

| | | | |
|---|---|---|---|
| 0135035 | 3/1985 | European Pat. Off. | H04N 5/243 |
| 0342708 | 11/1989 | European Pat. Off. | H04N 5/238 |

*Primary Examiner*—Andrew Faile
*Assistant Examiner*—Andrew B. Christensen
*Attorney, Agent, or Firm*—Sughrue, Mion, Zinn, Macpeak & Seas, PLLC

[57] ABSTRACT

A color camera capable of providing good dark gradation without color hue and saturation change is disclosed, the color camera comprising a picking-up device for converting an incident light into a video signal, a detector for detecting proportion of an area having a signal level below a predetermined dark level to produce a dark area proportion signal, and a stretching circuit for stretching a dark signal level in the video signal in accordance with the dark area proportion signal.

6 Claims, 4 Drawing Sheets

| | |
|---|---|
| BLANKING SIGNAL 814 | A  |
| SAMPLING PULSE 825 | B  |
| RESET PULSE 826 | C  |

COLOR VIDEO CAMERA CAPABLE OF IMPROVING GRADATION OF DARK SIGNAL LEVEL

This is a Continuation of application Ser. No. 08/266,583 filed Jun. 28, 1994, now abandoned.

BACKGROUND OF THE INVENTION

The present invention relates to a color video camera, and more particularly to a color video camera capable of improving gradation of a dark signal level.

As well known, a color video camera has a function of auto-signal level control by using iris servo mechanism. The iris servo mechanism controls an incident light to a pick-up device in the camera. FIG. 1 shows a scehmatic block diagram of a conventional color video camera. In this figure, light focused by an iris-equipped lens 1 is converted into red, green and blue component signals (R, G and B signals) by pick-up devices $2_R$, $2_G$ and $2_B$. The R, G and B signals undergo signal processing by processing circuits $3_R$, $3_G$ and $3_B$, each including a gamma correction part. After this, the processed R, G and B signals are converted into a composite video signal by combination of a matrix encoder 4 which delivers a luminance signal Y and chrominance signals I and Q, a chroma encoder 5 and an adder 6, for example. On the other hand, the processed R, G and B signals from the processing circuits $3_R$, $3_G$ and $3_B$ are supplied to an iris control circuit 7. This circuit 7 detects a video signal level and controls the iris in accordance with the detected video signal level so as to maintain the video signal level at a predetermined level. For signal level detection, the iris control circuit 7 adds peak values or average values of the R, G and B signals in a predetermined manner. Instead, it is possible to utilize a luminance signal Y delivered from the matrix encoder 4 to detect the video signal level. Therefore, when a luminance level of a picked-up image becomes higher, the iris becomes closed.

According to the conventional art, it is undesirably inherent that gradation in a dark region is compressed and deteriorated when a high luminance image is picked up, or direct strong light is incident in the case of a rear light situation, for example.

Particularly, even when a dark area proportion is relatively large in the whole image area, gradation of a dark region is compressed and thus, it is troublesome to observe image of the dark region in natural if the direct strong light having a small proportion is incident. To improve such gradation deterioration in a dark region, there is proposed a technique, as disclosed in Japan Laid-open Patent Application No. 2-56180 (1990) (the corresponding U.S. Pat. No. 4,969,045), in which a gamma correcting value ($\gamma$) is controlled in response to contrast of a picked-up image.

However, according to the above-mentioned prior art controlling a gamma correcting value, there is disadvantage that amplitudes of the chrominance signals I and Q delivered from the matrix encoder becomes changed according to the change of a gamma correcting value and, thus, color hue is undesirably changed, when a high color saturation image is picked up. For example, it is assumed that a high color saturation image having R, G and B color ratios of 100 for the R signal, 25 for the G signal and 0 for the B signal is picked up. When usual gamma correction having the gamma correcting value 0.45 (1/2.2) is applied, the R, G and B color ratios are shifted to 100 for the R signal, 53.6 for the G signal and 0 for the B signal, respectively. However, when the gamma correcting value is changed to 0.35 (1/2.9) according to the improving operation of the dark region gradation, the R, G, and B color ratios are varied to 100 for the R signal, 61.6 for the G signal and 0 for the B signal. Accordingly, except when the R, G and B color ratios are all the same as in the case of an uncolored image, the change of the gamma correcting value would cause undesirable hue change and color saturation change.

SUMMARY OF THE INVENTION

It is therefore an object of the present invention to provide a color video camera capable of improving gradation of a dark signal level without harmful color hue and color saturation changes.

It is an another object of the present invention to provide a video camera capable of obtaining good dark gradation even when a strong light is incident.

According to the present invention, there is provided a video camera comprising: a picking-up device for converting an incident light into a video signal; a detector for detecting area proportion having a signal level below a predetermined dark level to produce a dark area proportion signal; and a stretching circuit for stretching a dark signal level in the video signal in accordance with the dark area proportion signal.

DESCRIPTION OF THE PREFERRED EMBODIMENT

Figure 1:
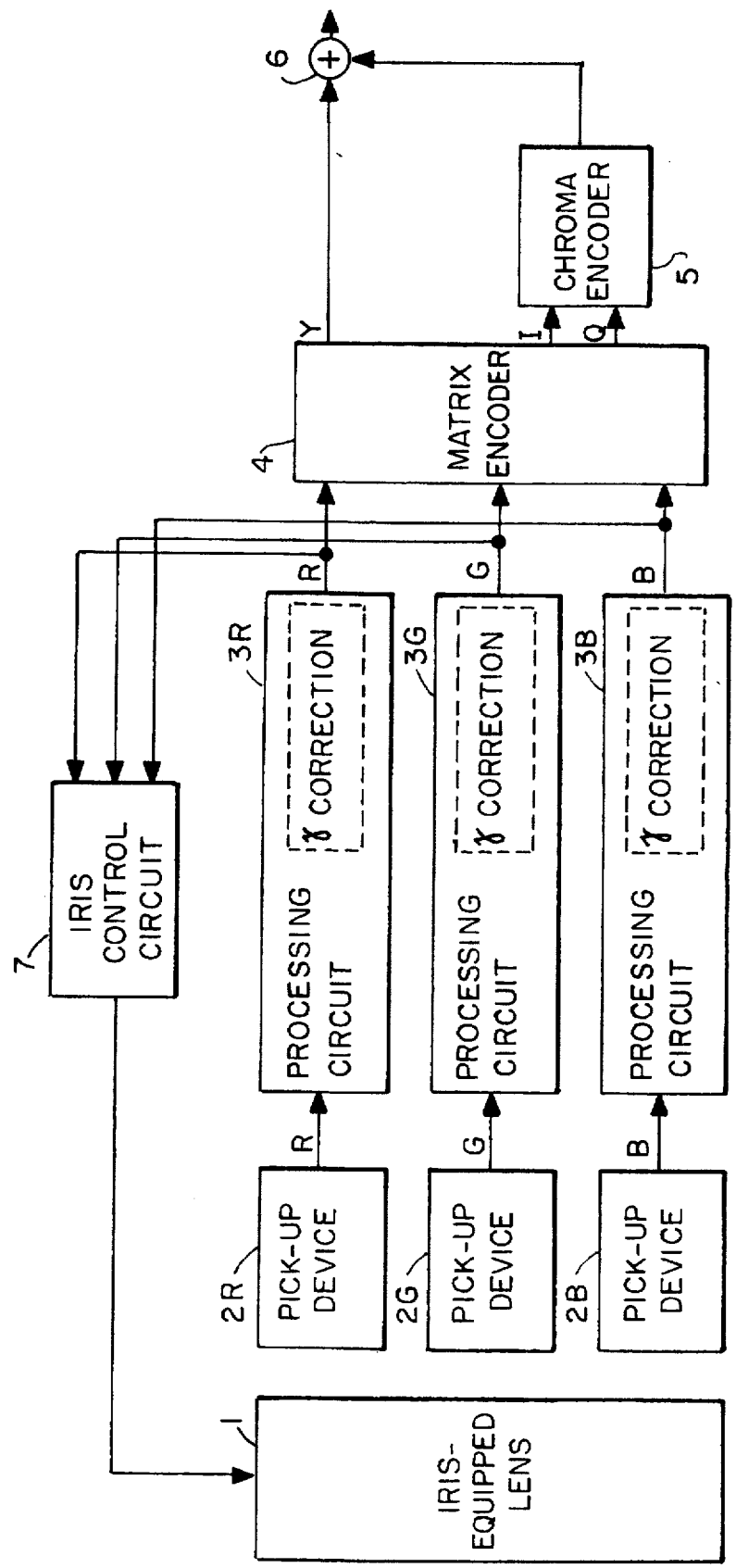
FIG. 1 shows a schematic block diagram of a conventional color video camera.
Figure 2:
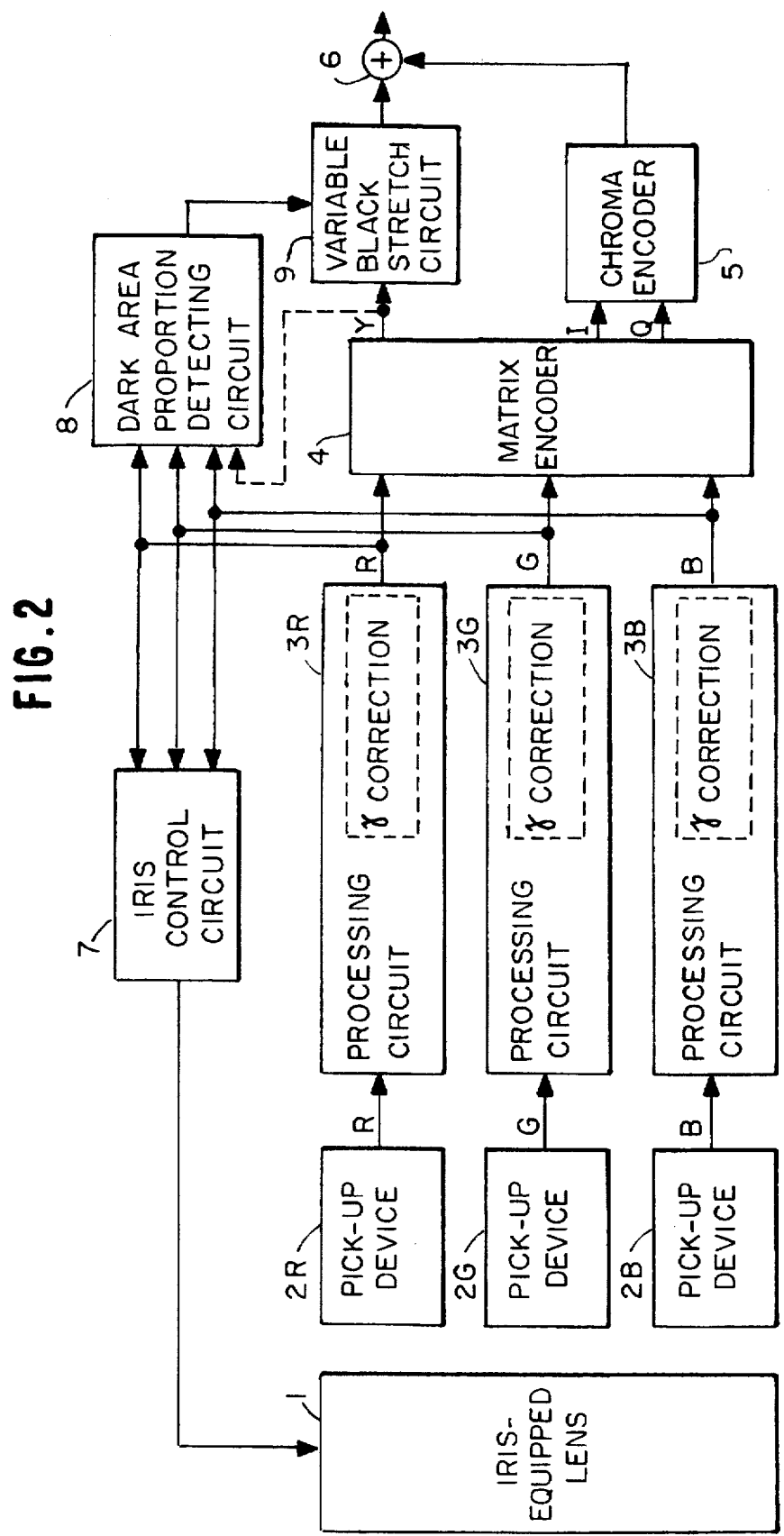
FIG. 2 shows a schematic block diagram of an embodiment according to the present invention.

Referring to FIG. 2 showing an embodiment of the present invention, it is the same as the conventional color video camera shown in FIG. 1 except for addition of a dark area proportion detecting circuit 8 which receives the processed R, G and B signals and detects dark area proportion in a whole picked-up image, and a variable black stretch circuit 9 which is inserted into the signal line of the luminance signal Y from the matrix encoder 4 to the adder 6.

Figure 3:
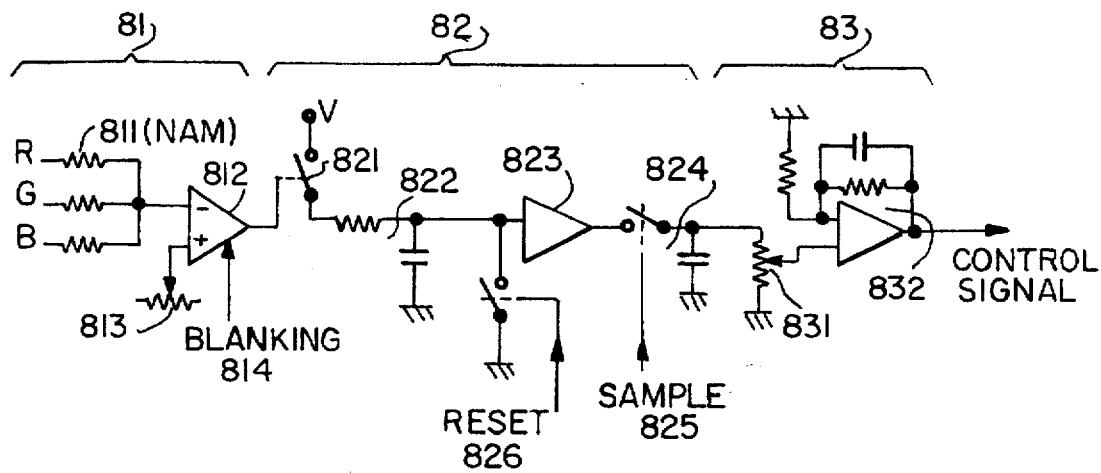
FIG. 3 is a circuit diagram of a dark area proportion detecting circuit contained in FIG. 2.
Figure 4A:
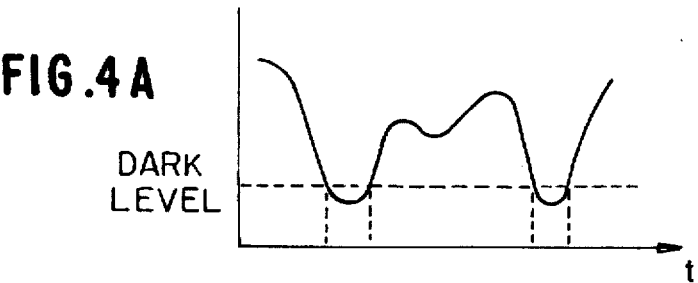
FIGS. 4(a) and 4(b) show waveforms for explaining dark area detecting operation of the circuit shown in FIG. 3.
Figure 4B:
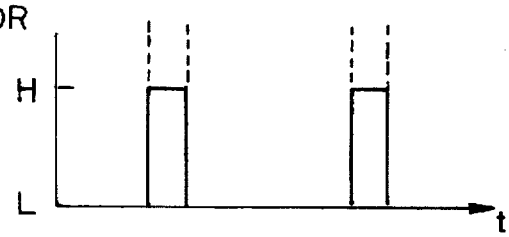

The dark area proportion detecting circuit 8, as shown in FIG. 3, comprises a dark detector 81 which detects a part having a signal level below a certain dark level, a ratio detector 82 which detects a proportion of the dark area in the whole image area and a control signal producing circuit 83. In the dark detector 81, the R, G and B signals from the processing circuits $3_R$, $3_G$ and $3_B$ (FIG. 2) are processed in a non-additive mixing (NAM) circuit 811 to deliver the corresponding luminance (Y) level and the resultant Y level is supplied to comparator 812. The comparator 812 delivers a output (H level) when the Y level has lower than the predetermined dark level 813 and is supplied with a blanking pulse 814. FIG. 4 shows the relationship between the Y level and the comparator's output.

Figure 5:
FIG. 5 shows a timing chart for explaining sample-holding operation of the circuit shown in FIG. 3.
Figure 5:
Figure 5:

Turning back to FIG. 3, in the ratio detector 82, a switch 821 supplies a certain voltage V to an integrating circuit 822 in response to the output of the comparator 812 of the dark detector 81. The output of the integrating circuit 822 is supplied through a buffer amplifier 823 to a sample-holding circuit 824 which receives a sampling pulse 825. Further, the input of the buffer 823 is reset by a reset pulse 826. FIG. 5 shows a timing relationship between the blanking pulse 814, the sampling pulse 825 and the reset pulse 826. A time constant of the integrating circuit 822 is designated such that, for example, its output becomes equal to the certain voltage V when the output H level of the comparator 812 is continued throughout the whole image period (one frame or field period). The sampling pulse 825 makes the sample-holding circuit 824 hold the integrated result at the end timing of the one image period and, after this, the integrated result is cancelled at the timing of the reset pulse 826. Therefore, the ratio detector 82 delivers an output representative of the proportion of the dark area in the whole image area.

The control signal producing circuit 83 includes a gain regulator 831 which determines a gain of the black stretch in the variable black stretch circuit 9 (FIG. 2) and an integrating amplifier 832 which eliminates transitional level change. The output of the circuit 83 is supplied to the variable black stretch circuit 9 as a control signal.

Figure 6:
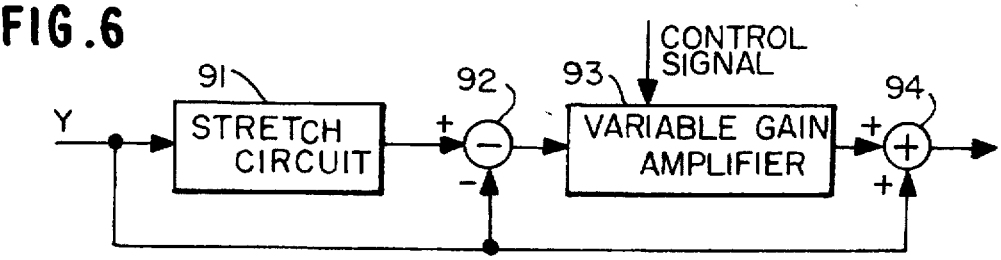
FIG. 6 shows a schematic block diagram of a variable black stretch circuit contained in FIG. 2.

As shown in FIG. 6, the variable black stretch circuit 9 comprises a stretch circuit 91 which stretchs a dark signal region, a subtracter 92 which delivers a difference signal between the stretched signal and the original signal, a variable gain amplifier 93 which amplifies the difference signal in accordance with the control signal supplied from the dark area proportion detecting circuit 8 and a adder 94 which adds the gain controlled difference signal and the original signal to output a resultant gradation improved signal.

Figure 7:
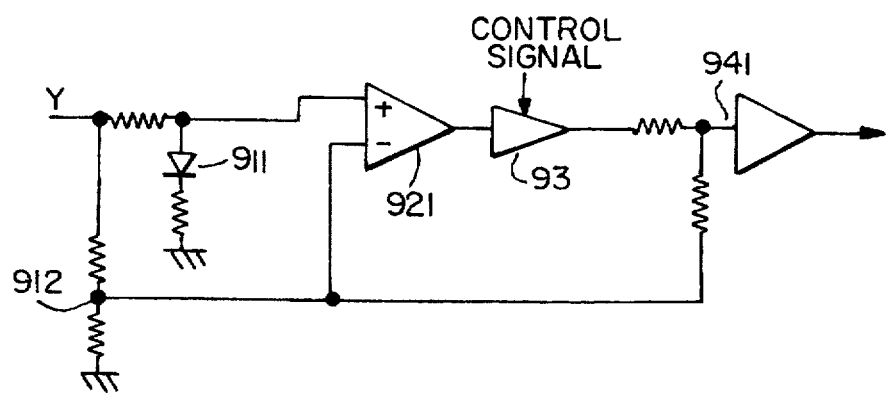
FIG. 7 is an example of a circuit diagram of the variable black stretch circuit shown in FIG. 6.
Figure 8A:
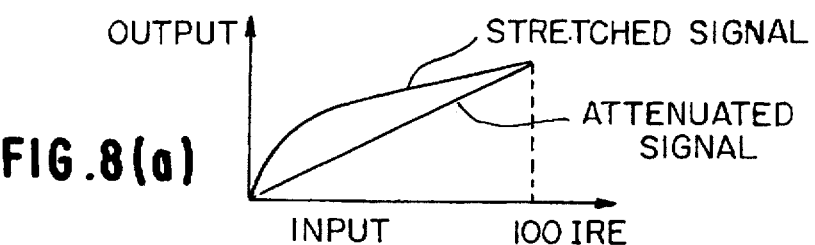
FIGS. 8(a), 8(b) and 8(c) show characteristic curves for explaining the operation of the variable black stretch circuit of FIG. 7.
Figure 8B:
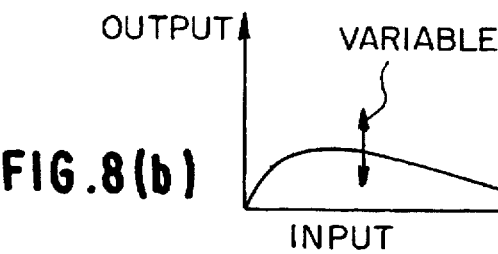
Figure 8C:
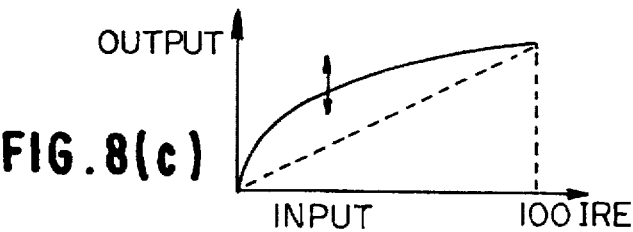

FIG. 7 is a circuitry example of the variable black stretch circuit 9 and FIGS. 8(a), 8(b) and 8(c) show characteristic curves for explaining the operation of this circuit. In FIG. 7, the stretch circuit 91 using a diode 911 stretchs the dark signal region by a characteristic curve of the diode as shown in FIG. 8(a). Further, an attenuator 912 controls the original signal level to have the same level at 100 IRE (100% signal level) as shown in FIG. 8(a). A differential amplifier 921 delivers the difference signal between the stretched signal and the attenuated signal. The variable gain amplifier 93 amplifies the difference signal with the variable gain in accordance with the control signal as shown in FIG. 8(b). An adding amplifier 941 delivers the added signal of the output signal from the variable gain amplifier 93 and the attenuated signal as shown in FIG. 8(c).

In the embodiment shown in FIG. 2, the dark area proportion detecting circuit 8 receives the R, G and B signals to detect the signal level. Incidentally it is possible to receive the Y signal delivered from the matrix encoder 4 to detect the signal level as shown by a dotted line. In this case, the NAM circuit 811 (FIG. 3) is unnecessary.

As described above, according to the present invention, even when a direct strong light is incident to a video camera, it is possible to improve gradation deterioration of the dark region without undesirable hue and saturation changes by stretching the Y signal level of the dark region in accordance with the dark area proportion in the whole image area.

What is claimed is:

1. A video camera comprising:
   means for converting an incident light into a video signal;
   means for producing a gamma corrected video signal by performing gamma correction on said video signal;
   means for detecting a proportion of a dark area in a whole image area formed by said gamma corrected video signal from said converting means, said dark area of said gamma corrected video signal having a lower signal level than a predetermined dark level, wherein said detecting means produces a dark area proportion signal based on said proportion of said dark area; and
   means for stretching a dark signal level in said gamma corrected video signal in accordance with said dark area proportion signal;
   wherein said detecting means comprises:
      a comparator for comparing a signal level based on said gamma corrected video signal with said predetermined dark level which is near said dark signal level to be stretched by said stretching means in order to detect a dark signal having said lower signal level than said predetermined dark level; and
      an integrator for integrating said dark signal from said comparator for a whole image period in order to detect said dark area proportion.

2. A video camera as claimed in claim 1, wherein said detecting means further includes means for eliminating a transitional signal change from an output of said integrator.

3. A video camera as claimed in claim 1, wherein said stretching means includes a diode to emphasize said dark signal level by using a characteristic of said diode to deliver an emphasized signal.

4. A video camera as claimed in claim 3, wherein said stretching means further includes control means for controlling a magnitude of said emphasized signal in accordance with said dark area proportion signal.

5. A video camera as claimed in claim 3, wherein said stretching means further comprises:
   means for calculating a difference between said emphasized signal and said video signal;
   means for variably amplifying said difference in response to said dark area proportion signal to produce an amplified difference signal; and
   means for adding said amplified difference signal and said video signal.

6. A color video camera comprising:
   means for producing red (R), green (G) and blue (B) color signals from an incident light image;
   means for producing gamma corrected R, G, and B color signals by performing gamma correction on said R, G, and B color signals;
   means for detecting a proportion of a dark area in a whole image area formed by said R, G and B color signals from said producing means, said dark area having a lower signal level than a predetermined dark level based on said gamma corrected R, G, and B color signals;
   means for converting said gamma corrected R, G and B color signals into a luminance signal and a chrominance signal; and
   means for stretching a dark signal level of said luminance signal output from said converting means signal in response to an output of said detecting means;
   wherein said means for detecting said dark area proportion comprises:

a comparator for comparing a signal level based on said gamma corrected R, G and B color signals with said predetermined dark level which is near said dark signal level to be stretched by said stretching means in order to detect a dark signal having said lower signal level than said predetermined dark level; and an integrator for integrating said dark signal from said comparator for a whole image period in order to detect said dark area proportion.

* * * * *